US006007242A

United States Patent [19]

Uehashi et al.

[11] Patent Number: 6,007,242

[45] Date of Patent: Dec. 28, 1999

[54] INFRARED TEMPERATURE SENSOR FOR A COOKING DEVICE

[75] Inventors: Hiroyuki Uehashi; Kazuyuki Takimoto; Masaru Noda; Eiji Fukunaga; Yuichi Otsuki, all of Shiga, Japan

[73] Assignee: Sanyo Electric Co., Ltd., Moriguchi-shi, Japan

[21] Appl. No.: 09/008,660

[22] Filed: Jan. 16, 1998

[30] Foreign Application Priority Data

Jan. 31, 1997 [JP] Japan .................................... 9-018344

[51] Int. Cl.[6] ............................ G01K 1/14; G01K 13/00; G01J 5/08; G01J 5/62

[52] U.S. Cl. ............................................ 374/149; 374/130

[58] Field of Search .................................... 374/149, 127, 374/130; 250/341.6

[56] References Cited

U.S. PATENT DOCUMENTS

| | | | |
|---|---|---|---|
| 4,347,418 | 8/1982 | Nobue et al. | 250/341.6 |
| 4,461,941 | 7/1984 | Fukuda et al. | 374/149 |
| 4,467,163 | 8/1984 | Pauly et al. | 374/149 |
| 4,471,193 | 9/1984 | Walter | 374/149 |
| 5,170,024 | 12/1992 | Hanatani | 374/149 |
| 5,372,426 | 12/1994 | Broudy et al. | 374/127 |
| 5,567,052 | 10/1996 | Yoshiike et al. | 374/130 |
| 5,693,247 | 12/1997 | Bu et al. . | |
| 5,744,786 | 4/1998 | Kim | 374/149 |
| 5,796,081 | 12/1996 | Carlsson et al. | 374/149 |
| 5,797,682 | 1/1997 | Kert et al. | 374/127 |
| 5,826,980 | 8/1996 | Kouzu et al. | 374/130 |

FOREIGN PATENT DOCUMENTS

| | | | |
|---|---|---|---|
| 0015710 | 2/1980 | European Pat. Off. | 374/149 |
| 56-46436 | 9/1979 | Japan | 374/127 |
| 2 280 829 | 8/1993 | United Kingdom . | |
| 93018494 | 3/1992 | WIPO | 374/127 |

OTHER PUBLICATIONS

English abstract of JP 3–231125 (A), application No. 2–27492, Oct. 1991.

*Primary Examiner*—Diego Gutierrez
*Assistant Examiner*—Pia Tibbits
*Attorney, Agent, or Firm*—Armstrong, Westerman, Hattori, McLeland & Naughton

[57] ABSTRACT

A cooking device includes an infrared ray sensor disposed to sense infrared radiation from food obliquely from the above. Infrared ray sensor includes a printed circuit board, a light receiving portion, a photointerrupter, and a chopper. The chopper includes a horizontal vane portion and a vertical vane portion. The chopper is disposed between the light receiving portion of infrared ray sensor and food such that the vertical vane portion passes between the light emitting device and light receiving device of photointerrupter and that horizontal vane portion passes between the light receiving portion of infrared ray sensor and food when chopper rotates. Thus, an improved microwave oven having a reduced occupied area which can be manufactured less costly can be provided.

10 Claims, 13 Drawing Sheets

INFRARED TEMPERATURE SENSOR FOR A COOKING DEVICE

BACKGROUND OF THE INVENTION

1. Field of the Invention

The present invention relates generally to cooking device, and more particularly, to a microwave oven having an infrared ray sensor disposed to sense infrared radiation from food obliquely from the above.

2. Description of the Background Art

Cooking device use an infrared ray sensor as shown in FIG. 15 to sense the temperature of food. The infrared ray sensor converts sensed infrared radiation from the food into electric energy. Referring to FIG. 15, infrared ray sensor 1 includes a base 2, a light receiving portion 3 and an amplifier 4 provided on base 2. Light receiving portion 3 and amplifier 4 are protected in a case 6 having a silicon transparent window 5. Light receiving portion 3 and amplifier 4 are connected to a terminal 7.

Such an infrared sensor used in a microwave oven is a pyroelectric infrared ray sensor formed of monocrystals of lithium tantalate ($LiTaO_2$). Light receiving portion 3 absorbs infrared rays coming through silicon transparent window 5, and converts the absorbed rays into electric energy. Amplifier 4 is formed of a thick film circuit chip.

The infrared ray sensor responds to those forming intermittent light among incoming infrared rays to provide alternate voltage. Referring to FIG. 16, the microwave oven is provided with a chopper (breaker) 8 having open and closed portions rotating at fixed intervals to have an alternate signal based on the temperature differential between food and chopper 8. The alternate signal is amplified to control the heating temperature using an adder, a comparator and a microcomputer.

Referring to FIG. 16, chopper 8 is rotated by a chopper motor 9 such that the vanes of chopper 8 pass through the light emitting device and light receiving device of a photointerrupter 10 as will be described. A solenoid 11 as will be also described is used to open/close a shutter 12.

FIG. 17 is a view showing the concept of a microwave oven including an infrared ray sensor and the associated portions. The microwave oven has a cavity 17 in which a turn table 18 is provided. Turn table 18 is turned by a pulley 20 through a turn table shaft 19. A cook net 21 is sometimes provided on turn table 18. In FIG. 17, a cup **22*a* is placed on turn table 18. Microwaves are introduced into cavity 17 from a magnetron 22 through a waveguide 23. Hot air 25 is introduced into cavity 17 through a nozzle 24. Infrared ray sensor 1 is provided at an upper position of cavity 17. Chopper 8 is provided under infrared ray sensor 1. Chopper 8 is rotated by chopper motor 9. In FIG. 17, shutter 12 is provided under chopper 8, and shutter 12 is opened/closed by solenoid 11. Though not shown, such a conventional microwave oven is provided with a dedicated cooling fan for cooling infrared ray sensor 1. Cooling air from the cooling fan is let in in the direction of arrow A, and let out in the direction of arrow B. A beam denoted by reference numeral 25** is infrared radiation from food.

Now, the chopper and the chopper motor will be described further in detail in conjunction with FIG. 18.

In order to convert the temperature of food into an electrical signal using an infrared ray sensor, the dose differential between infrared radiation from food and infrared radiation from a reference object is produced. The chopper is provided for the purpose between the light receiving portion of the infrared ray sensor and incoming infrared rays radiated from food.

Referring to FIG. 18, chopper 18 has three vanes and have vane portions and other portions with no vane provided at equal intervals. Chopper motor 9 is formed of a 24-pole stator having coil windings and a rotor having a permanent magnet, and applies a rotating force to chopper 8. Chopper 8 is fixed to chopper motor 9 by a spring 13, a washer 14, an idle bush 15 and an E ring 16.

Referring to FIG. 19, the solenoid and the shutter will be described in further detail.

Infrared rays from food come into the light receiving portion of the infrared ray sensor through a microwave cutoff pipe 27, and therefore smoke containing oil emitted during the heating operation of the microwave oven comes into the sensor through microwave cutoff pipe 27. Cooling air for the infrared ray sensor coming into the oven through microwave cutoff pipe 27 adversely affects the oven temperature. In order to avoid the effect, referring to FIG. 19, the upper surface of microwave cutoff pipe 27 is closed by shutter 12 operated by solenoid 11 unless the sensor operates. When the sensor operates, solenoid 11 is excited to open shutter 12. In FIG. 19, the portion in dotted line 26 corresponds to the position of shutter 12 during the operation of the sensor. Shutter 12 is opened/closed by solenoid 11 and a shutter spring 28.

Referring to FIG. 20, the photointerrupter will be described further in detail. Referring to FIG. 20, photointerrupter 10 is a photocoupling element formed of a combination of a light emitting device (LED) 29 and a light receiving device (phototransistor) 30. Chopper 8 rotates in the direction of arrow A. When a vane of chopper 8 is between these devices (in the state shown by the oblique lines in FIG. 20), light is cut off and the light receiving device 30 of photointerrupter 10 is turned off. This is serially repeated using the chopper motor to generate a signal having a rectangular waveform at equal intervals. Meanwhile, the waveform generated by the infrared ray sensor is in an alternate form if the food temperature and the chopper temperature are reversed from each other, and therefore the signal of photointerrupter 10 and the signal of the infrared ray sensor are synchronized for comparison. As a result, if the temperature of food is higher than the temperature of the reference object, positive voltage results, and otherwise negative voltage results (which will be further described in Description of the Preferred Embodiments in conjunction with the accompanying drawings).

Referring to FIG. 17, the conventional microwave oven should be provided with infrared ray sensor 1 over cavity 17 and a dedicated cooling fan for cooling infrared ray sensor 1. As a result, a large area is occupied by the microwave oven. In addition, since infrared ray sensor 1 is provided over cavity 17, bits of food placed on turn table 18 bump against infrared ray sensor 1. Furthermore, infrared ray sensor 1 is stained with oil coming up from a food. In addition to the dedicated cooling fan for the infrared ray sensor, the shutter and the solenoid shown in FIG. 19 must be provided, which pushes up the entire cost.

SUMMARY OF THE INVENTION

It is therefore an object of the invention to provide an improved cooking device which can be installed in a reduced space.

Another object of the invention is provide an improved microwave oven in which an infrared ray sensor is not stained with bumping bits from food.

Yet another object of the invention is to provide an improved microwave oven having a reduced number of components which can be manufactured less costly.

A cooking device according to the present invention includes an infrared ray sensor disposed to sense infrared radiation from food obliquely from the above. The infrared ray sensor includes a printed circuit board, a light receiving portion, a photointerrupter, and a chopper. The light receiving portion is provided on the printed circuit board, absorbs infrared radiation from food, and converts the absorbed infrared radiation into electric energy. The photointerrupter is provided on the printed circuit board and includes a light emitting device and a light receiving device spaced apart from each other. The chopper is provided between the light receiving portion of the sensor and food in order to produce the dose differential between infrared radiation from the food and infrared radiation from a reference object. The chopper has a plurality of vanes extending radially from the shaft center in a plane parallel to the surface of the printed circuit board, a horizontal vane portion having alternately provided vane portions and portions with no vane, a plurality of vanes extending vertically from the center of the horizontal vane portion to the surface of the printed circuit board and disposed concentrically around the shaft center, and a vertical vane portion having alternately provided vane portions and portions with no vane. The chopper rotates around the shaft center. The chopper is provided between the light receiving portion of the infrared ray sensor and food such that the vertical vane portion passes between the light emitting device and light receiving device of the photointerrupter and the horizontal vane portion passes through the light receiving portion of the infrared ray sensor and the food by the rotating movement of the chopper.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a partially enlarged view showing the portion at which the vertical vane portion of the chopper according to the present invention passes through;

DESCRIPTION OF THE PREFERRED EMBODIMENTS

Now, embodiments of the present invention will be described in conjunction with the accompanying drawings.

First Embodiment

Figure 1:
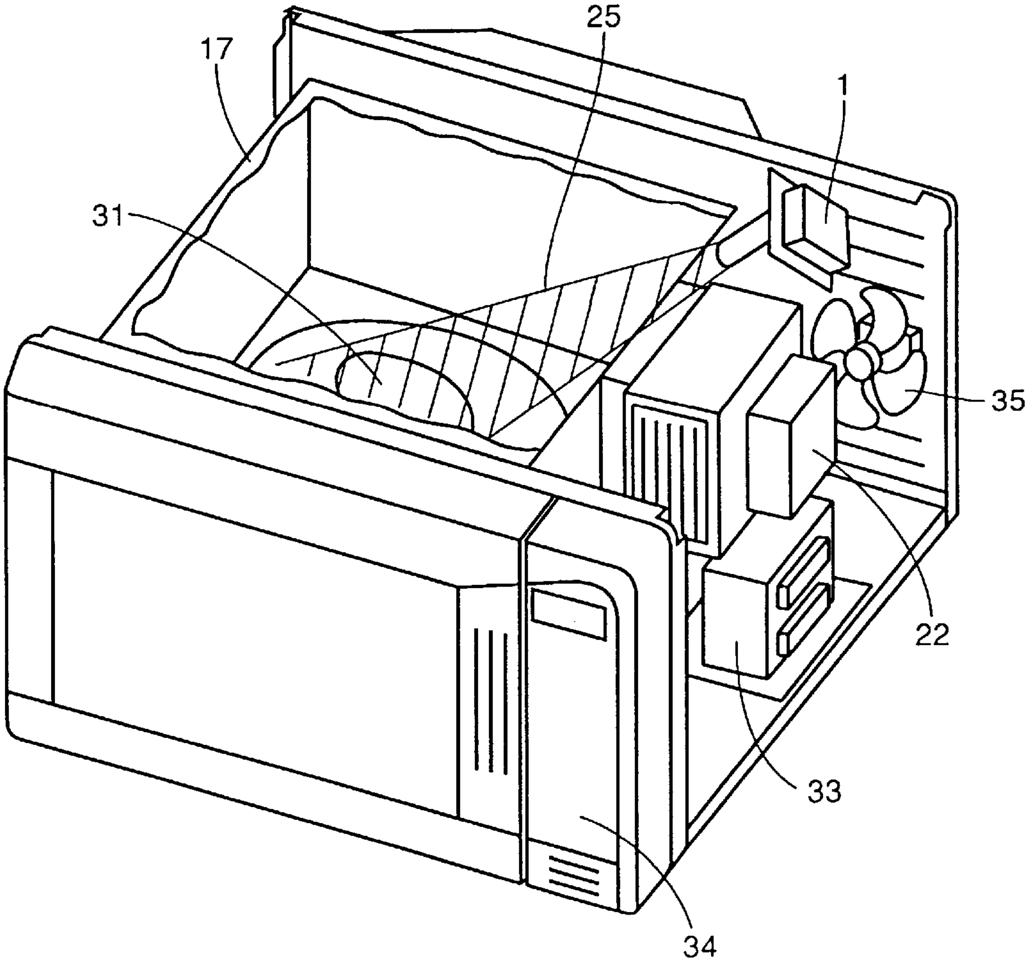
FIG. 1 is a perspective view showing a microwave oven according to one embodiment of the invention.

FIG. 1 is a perspective view showing a microwave oven according to a first embodiment of the invention.

An infrared ray sensor 1 is disposed on a side of cavity 17 to sense infrared radiation 25 from food 31 obliquely from the above. A magnetron 22 supplies microwaves into cavity 17.

A high voltage transformer 33 is provided under magnetron 22. An operation panel 34 is used to set cooking conditions. A cooling fan 35 is used to cool not only magnetron 22 but also infrared ray sensor 1.

Since infrared ray sensor 1 is provided on the side of cavity 17, the occupied area is reduced as compared to the conventional case of providing the sensor on the top. Furthermore, cooling fan 35 used to cool magnetron 22 in the conventional case also cools infrared ray sensor 1, a dedicated cooling fan for the infrared ray sensor is not necessary, which reduces the entire cost.

Figure 2:
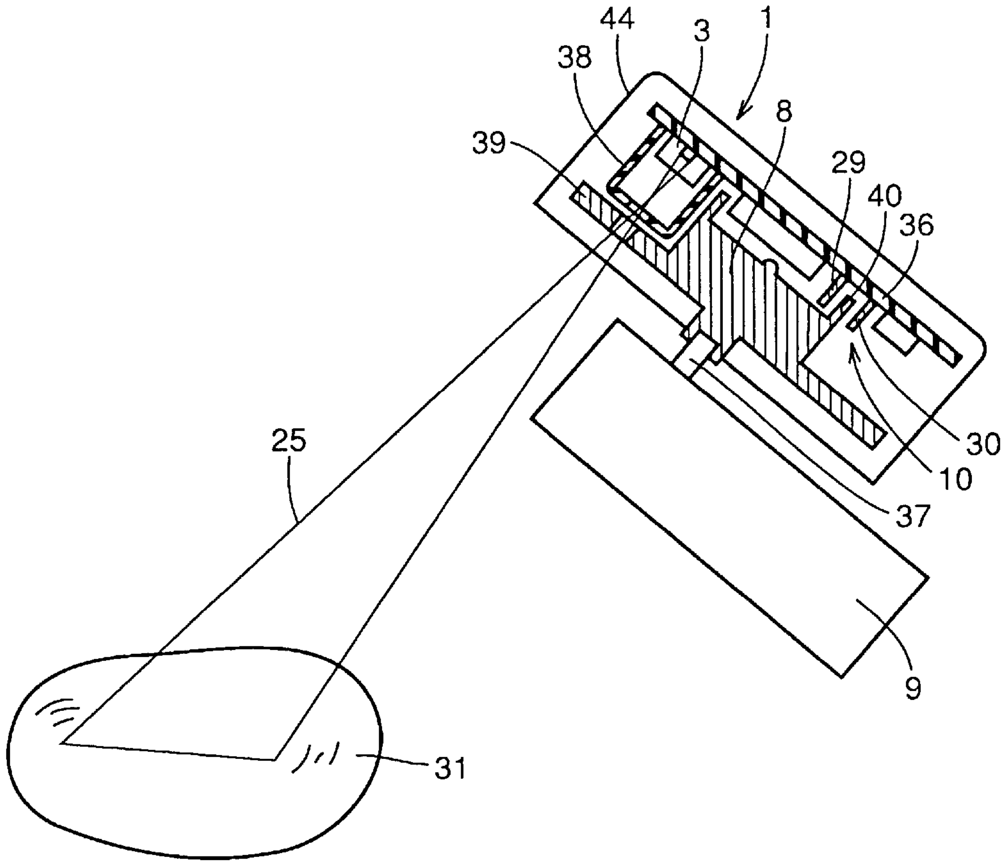
FIG. 2 is a cross sectional view showing the internal structure of an infrared ray sensor according to the present invention.

FIG. 2 is a view showing the internal structure of the infrared ray sensor. In FIG. 2, infrared ray sensor 1 senses infrared radiation 25 from food 31 obliquely from the above. Referring to FIG. 2, infrared ray sensor 1 includes a printed circuit board 36. There is provided a light receiving portion 3 on printed circuit board 36 to absorb infrared radiation 25 from food 31 and converts the absorbed radiation into electric energy. A photointerrupter 10 including a light emitting device 29 and a light receiving device 30 spaced apart from each other is provided on printed circuit board 36. A chopper 8 is provided between light receiving portion 3 and the food. The structure of chopper 8 will be described later in detail. Chopper 8 is pressed in and fixed to the shaft 37 of a motor 9. A tubular enclosure 38 (which will be also described later) having an opening at its upper end through which infrared rays pass is provided on printed circuit board 36, covering light receiving portion 3.

Now, the structure of chopper 8 will be described.

Figure 3:
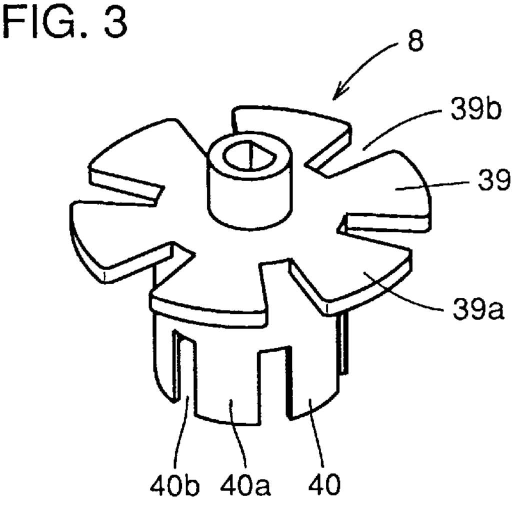
FIG. 3 is a perspective view showing a chopper according to the present invention.
Figure 4:
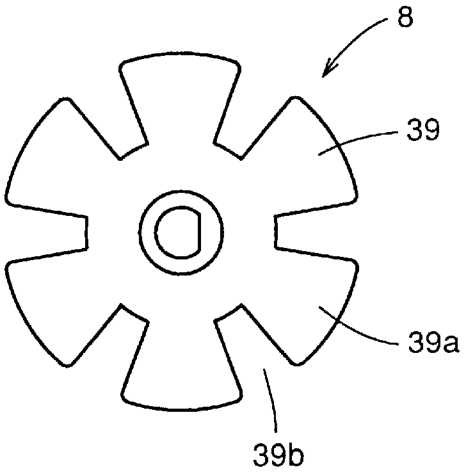
FIG. 4 is a plan view showing the chopper according to the present invention.
Figure 5:
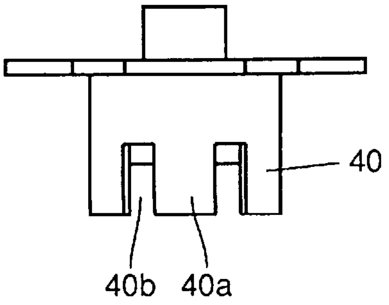
FIG. 5 is a side view showing the chopper according to the present invention.
Figure 6:
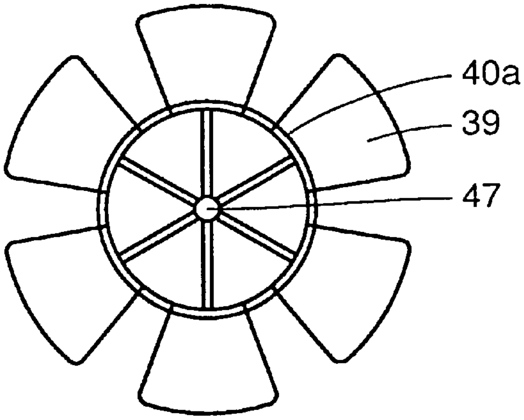
FIG. 6 is a view showing the chopper according to the present invention seen from the bottom.

FIG. 3 is a perspective view showing chopper 8, FIG. 4 a plan view, FIG. 5 a side view, and FIG. 6 a view seen from the bottom.

Referring to these figures and FIG. 2, chopper 8 has a horizontal vane portion 39 and a vertical vane portion 40. Horizontal vane portion 39 has a plurality of vanes 39*a* extending radially from the shaft center in a plane parallel to the surface of printed circuit board 36, and vanes 39*a* and portions with no vane 39*b* are alternately provided. Vertical vane portion 40 has a plurality of vanes 40*a* extending vertically from the center of horizontal vane portion 39 to the surface of printed circuit board 36. The plurality of vanes 40*a* are disposed concentrically around the shaft center of chopper 8, and vanes 40*a* and portions with no vane 40*b* are alternately provided. Horizontal vane portion 39 is preferably formed of a high thermal conductive material (such as aluminum). Thus, output fluctuations caused by the temperature variation of the vanes can be prevented.

Referring to FIG. 2, chopper 8 is pressed in and fixed to the shaft 39 of motor 9. Chopper 8 is disposed between the light receiving portion 3 of infrared ray sensor 1 and food 31 such that vertical vane portion 40 passes between the light emitting device 29 and light receiving device 30 of photointerrupter 10 and that horizontal vane portion 39 passes between the light receiving portion 3 of infrared ray sensor 1 and food 31.

Now, the operation of the chopper will be described.

Figure 7:
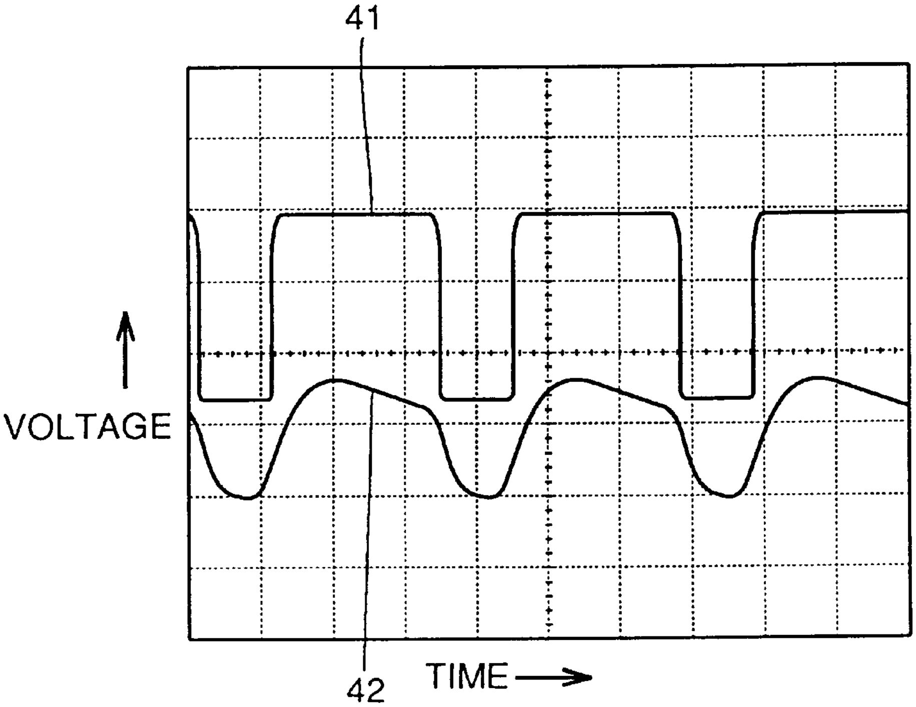
FIG. 7 is a graph for use in illustration of the operation of the chopper according to the present invention.

Referring to FIGS. 2 and 7, when the vertical vane portion 40 of chopper 8 is inserted between the light emitting device 29 and light receiving device 30 of the photointerrupter, light is cut off and light receiving device 30 is turned off. This is serially repeated by chopper motor 9 to generate a rectangular-waveform signal 41 at equal intervals. Meanwhile, a waveform 42 generated by infrared ray sensor 1 is still in an alternate form if the temperature of food 31 and the temperature of the horizontal vane portion 39 of chopper 8 are reversed, and therefore the signal 41 of the photointerrupter and the signal 42 of the infrared ray sensor are synchronized for comparison. If the food temperature is higher than the temperature of horizontal vane portion 39, positive voltage results and otherwise negative voltage results. The experimental data given in FIG. 7 was obtained by measuring iced water as a food sample.

Figure 8:
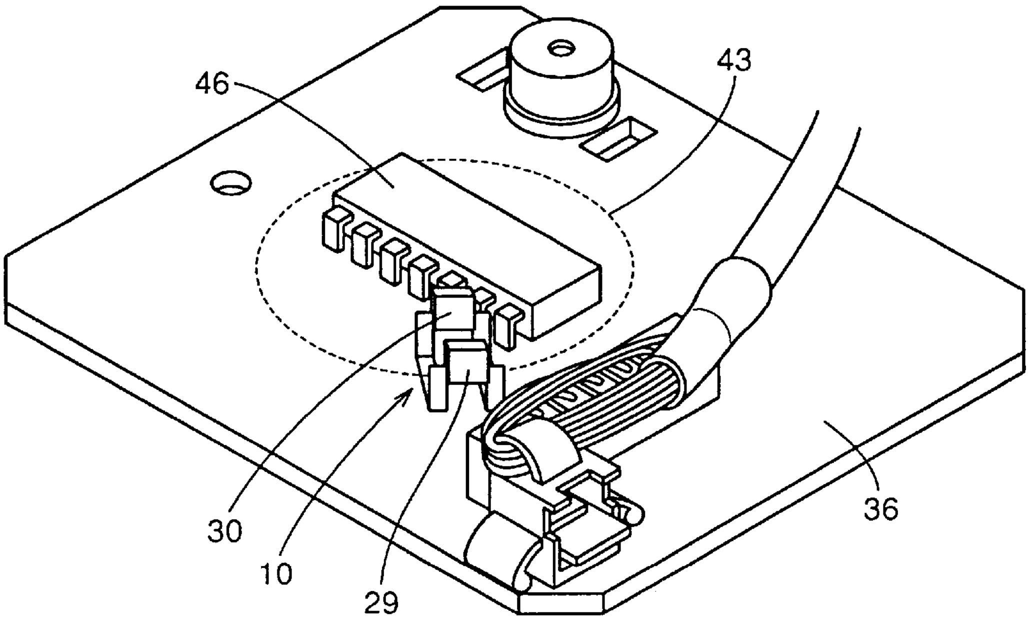

FIG. 8 is an enlarged view showing the position on the printed circuit board at which the vertical vane portion of the chopper passes. At the position 43 through which the vertical vane portion of the chopper passes, no electronic component is placed. As described above, the vertical vane portion of the chopper passes between the light emitting device 29 and light receiving device 30 of photointerrupter 10. The vertical vane portion rotates as if surrounding a control IC 46 which will be described.

Figure 9:
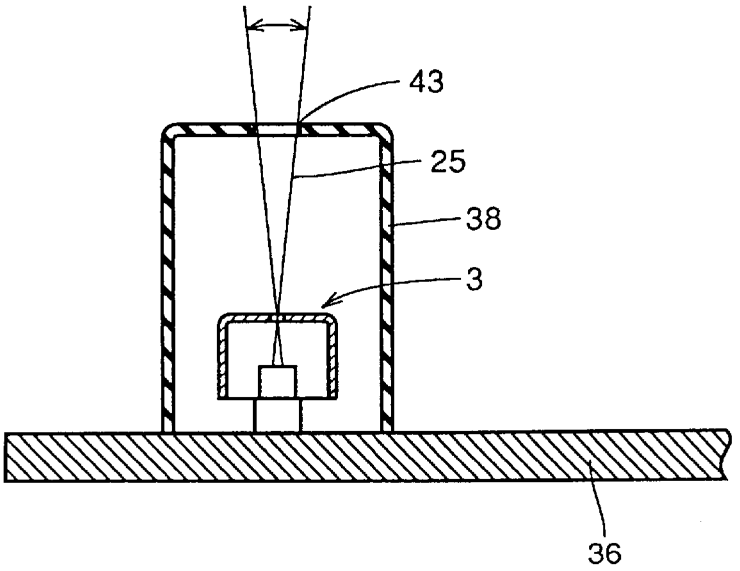
FIG. 9 is a cross sectional view showing an aperture provided on a printed circuit board according to the present invention.

Referring to FIGS. 2 and 9, there is provided a tubular enclosure 38 on printed circuit board 36, covering light receiving portion 3. The aperture has an opening 43 at its upper end through which infrared rays 25 pass. Tubular enclosure 38 is used to control the angle of incidence of infrared rays 25.

Figure 10:
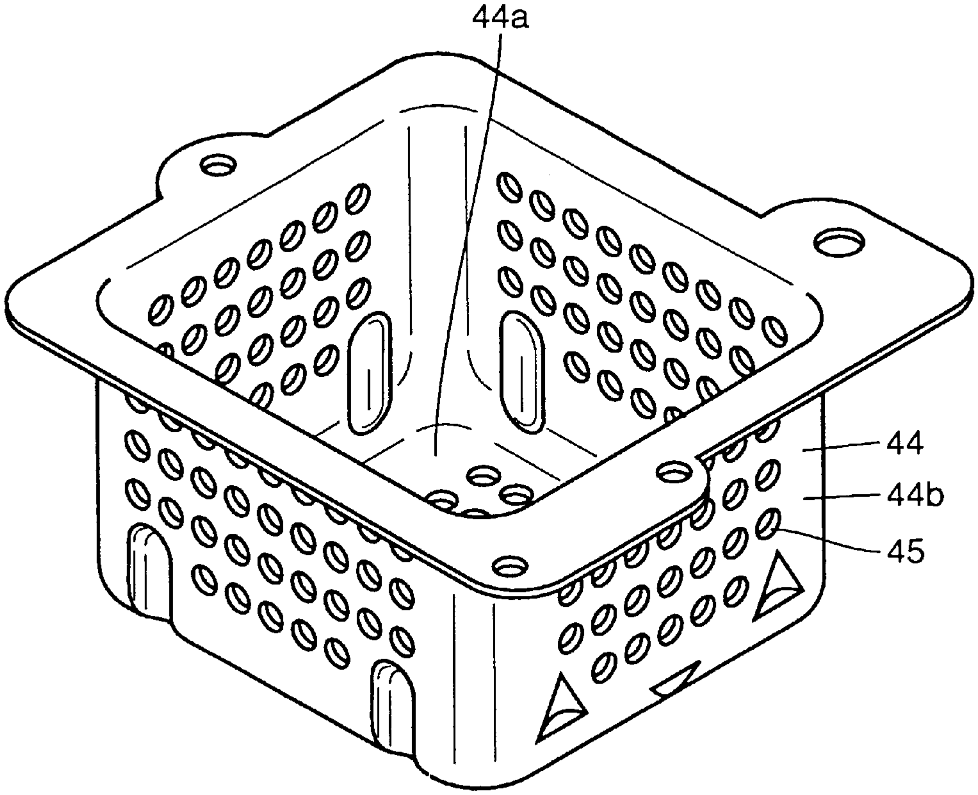
FIG. 10 is a perspective view showing a shield box according to the present invention.

Referring to FIGS. 2 and 10, printed circuit board 36 and chopper 8 are accommodated within a shield box 44 having a bottom surface 44*a* and a sidewall surface 44*b*. Sidewall surface 44*b* is provided with a plurality of ventilation holes 45 to let in cooling air.

Figure 11:
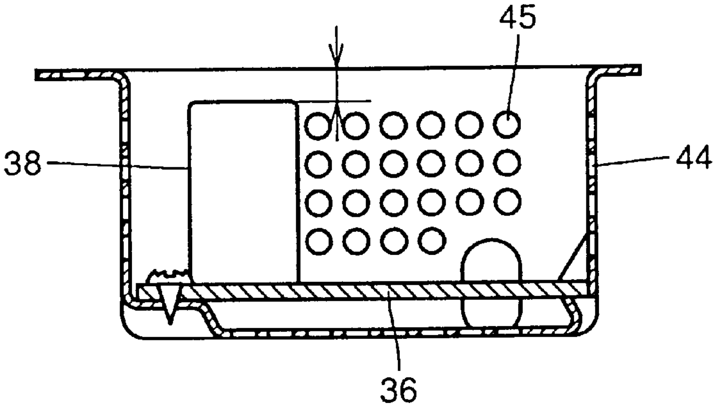
FIG. 11 is a cross sectional view showing how the aperture and the printed circuit board are placed within the shield box according to the present invention.

FIG. 11 is a cross sectional view showing the state in which printed circuit board 36 and enclosure 38 provided thereon are accommodated in shield box 44. Printed circuit board 36 is fixed to the bottom surface of shield box 44. Ventilation openings 45 are provided at such positions that cooling air is not directly let into the opening 43 of aperture 38 from printed circuit board 36. More specifically, ventilation holes 45 are provided at positions lower than the height of the upper end of enclosure 38. Thus, cooling air is not let into the light receiving portion of the infrared ray sensor, which improves the performance of the sensor.

Figure 12:
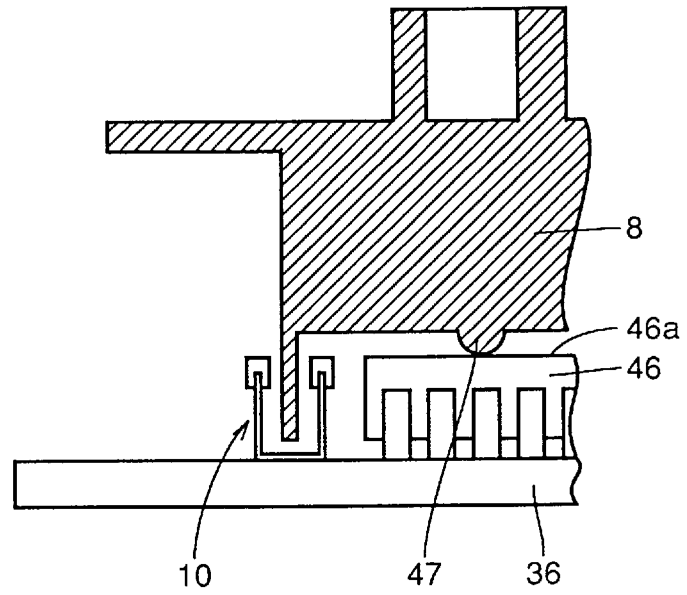
FIG. 12 is a view showing the state in which the chopper according to the present invention is nearly removed from the shaft of the motor.

Referring to FIGS. 2 and 12, control IC 46 having an upper surface 46*a* is provided on printed circuit board 36. Though not shown, chopper 8 is pressed in and fixed to the shaft of the motor as described above. Chopper 8 includes a raised portion 47 positioned in the center thereof and extending toward the surface of printed circuit board 36. The height of raised portion 47 is selected such that raised portion 47 abuts against the upper surface 46*a* of control IC 46 and chopper 8 is not completely detached from the shaft of the motor even if the adhering force of chopper 8 and the shaft of the motor is lowered.

Figure 13:
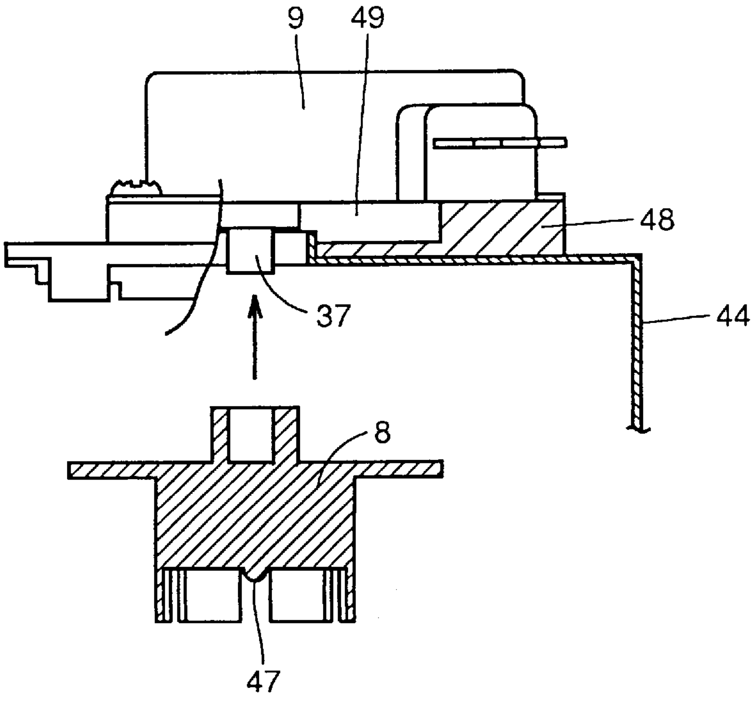
FIG. 13 is a view showing the connected portion of the chopper, the shield box and the chopper motor.

Referring to FIG. 13, as described above, chopper 8 is pressed in and fixed to the shaft 37 of motor 9. There is provided a resin board 48 between motor 9 and shield blocks 44 to prevent heat generated from motor 9 from coming into shield box 44. Resin board 48 and motor 9 are separated from each other to define a air layer 49 therebetween. By the presence of resin board 48 and air layer 49, heat generated from motor 9 does not enter infrared ray sensor 1.

Figure 14:
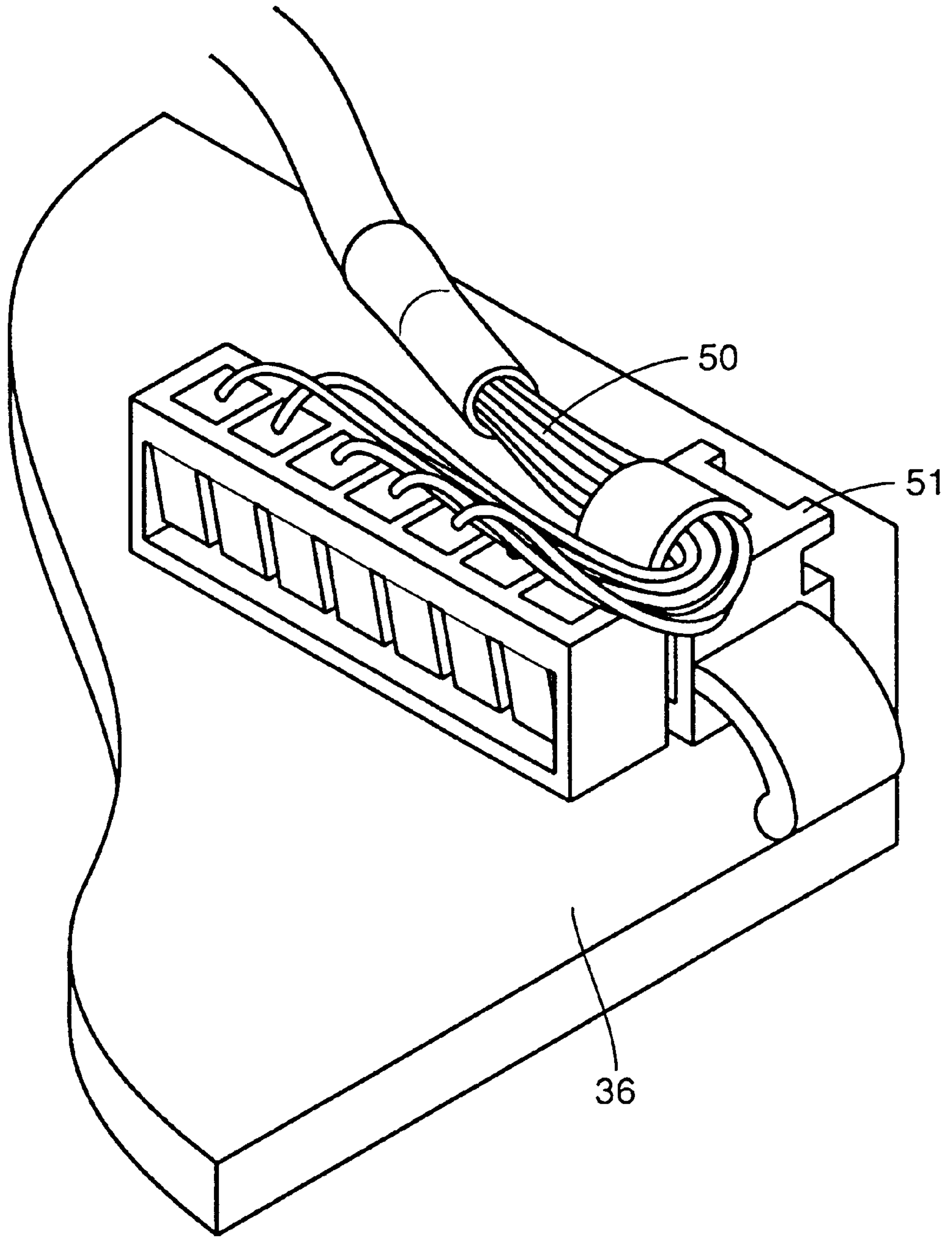
FIG. 14 is a perspective view showing fixing member provided on the printed circuit board for fixing input terminals in a bundle.
Figure 15:
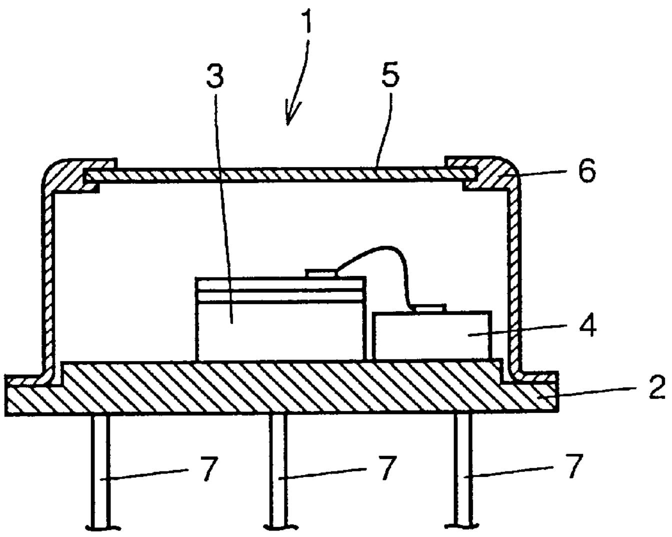
FIG. 15 PRIOR ART
FIG. 15 is a view showing the concept of a conventional infrared ray sensor.
Figure 16:
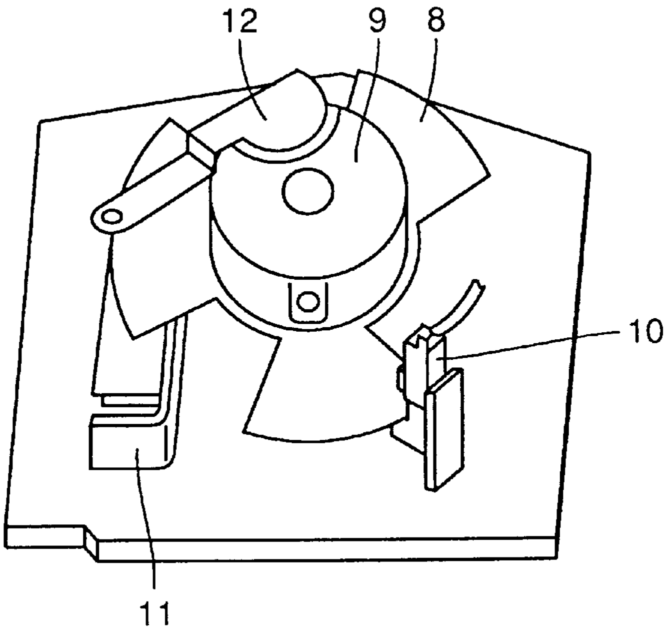
FIG. 16 PRIOR ART
FIG. 16 is a view showing the concept of a conventional chopper.
Figure 17:
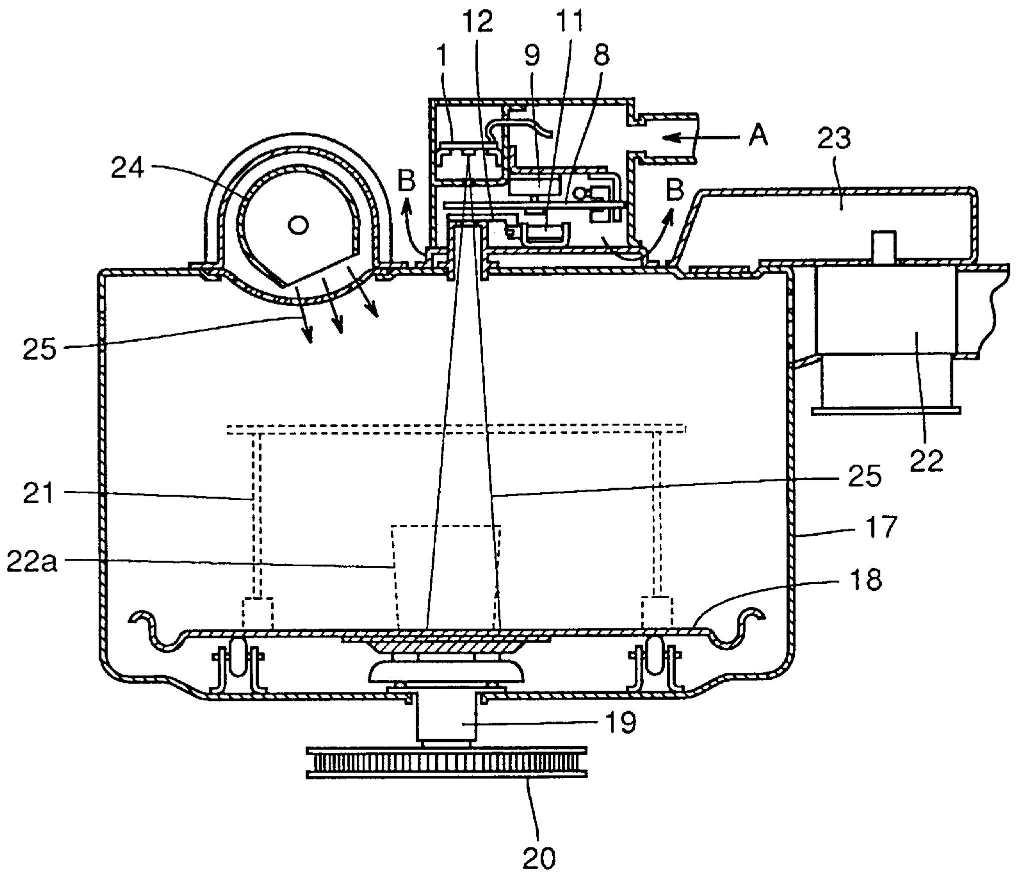
FIG. 17 PRIOR ART
FIG. 17 is a cross sectional view showing a microwave oven including a conventional infrared ray sensor.
Figure 18:
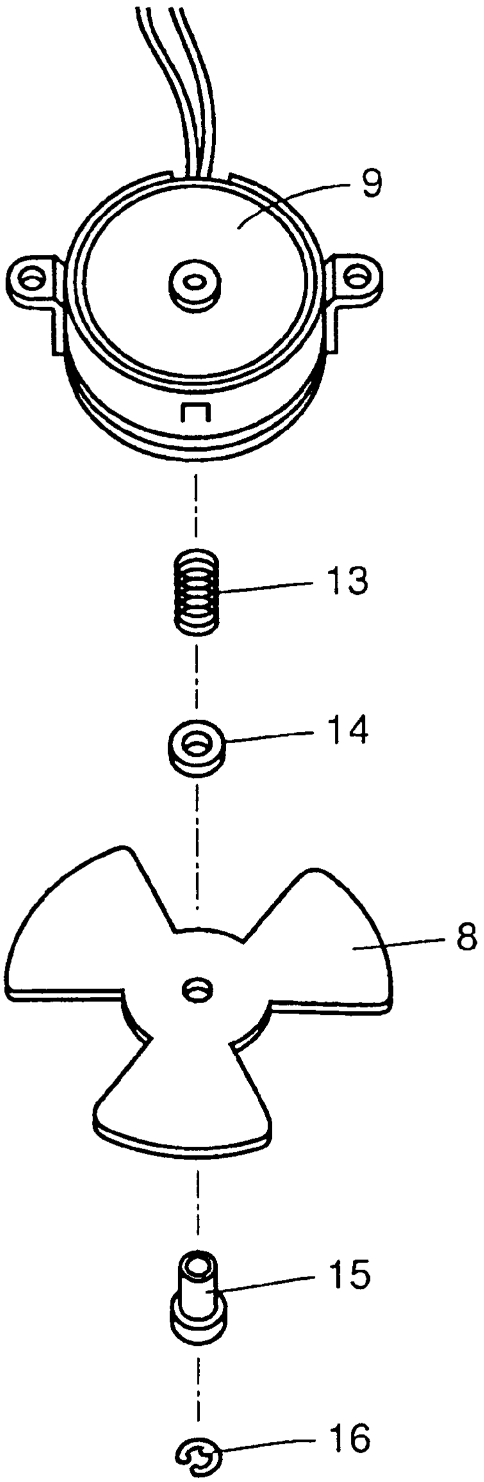
FIG. 18 PRIOR ART
FIG. 18 is an exploded perspective view showing how the conventional chopper and a chopper motor are coupled.
Figure 19:
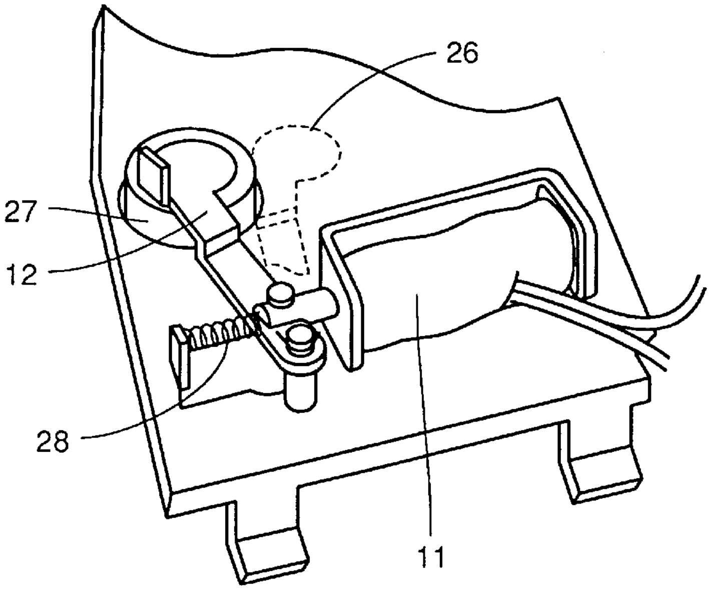
FIG. 19 PRIOR ART
FIG. 19 is a perspective view showing a combination of a conventional solenoid and a conventional shutter.
Figure 20:
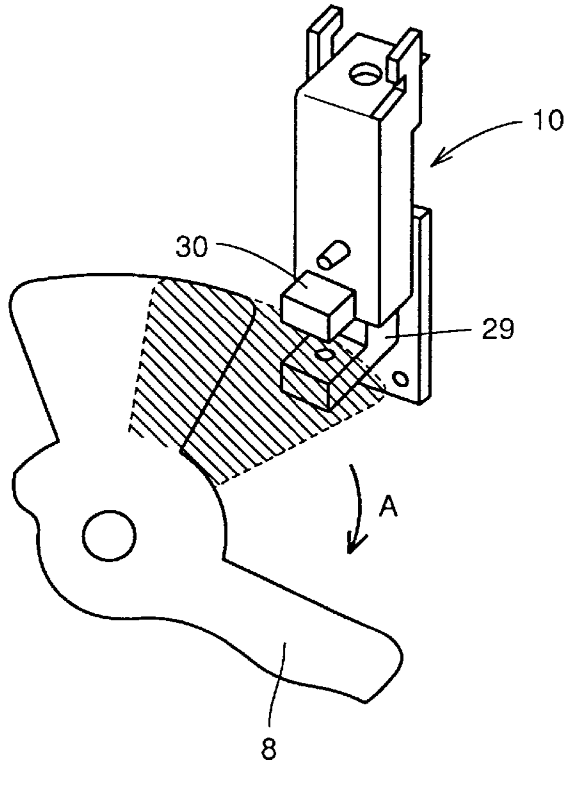
FIG. 20 PRIOR ART
FIG. 20 is a perspective view showing the relation between the conventional chopper and a photointerrupter.

In this embodiment, referring to FIGS. 8 and 14, there is provided a fixing member 51 on printed circuit board 36 for fixing input terminals 50 in a bundle. By providing fixing member 51, input terminals 50 will not come apart.

Second Embodiment

Figure 21:
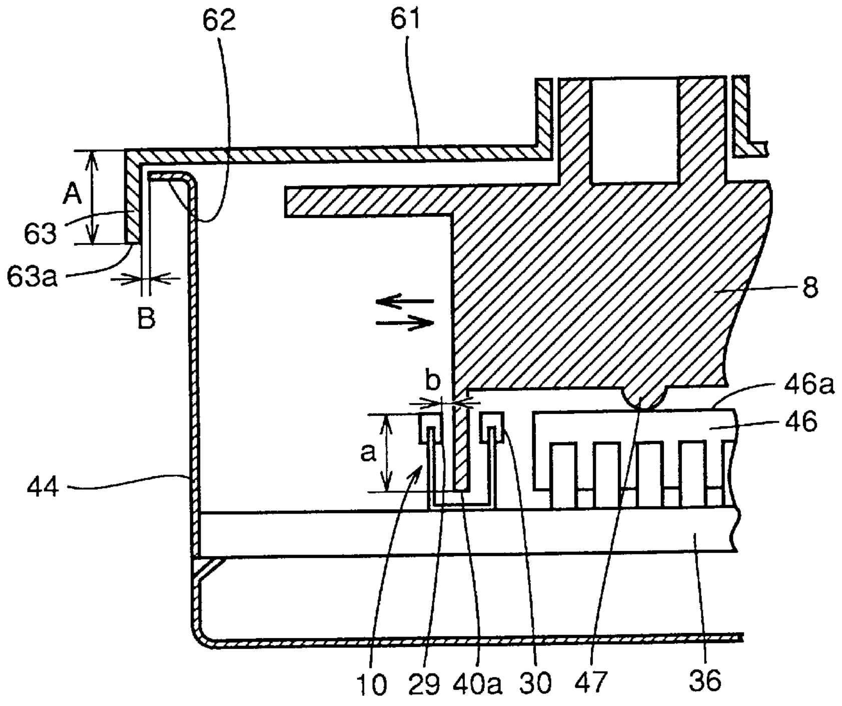
FIG. 21 is a view showing the internal structure of an infrared ray sensor according to a second embodiment of the invention.

FIG. 21 is a view showing the structure of an infrared ray sensor according to a second embodiment of the invention. Referring to FIG. 21, the infrared ray sensor includes a stage 61 to install a motor (not shown) to rotate a chopper 8. Stage 61 also serves as a lid for shield box 44. A first flange 62 extending outwardly in the horizontal direction is provided at the upper end of shield box 44. A second flange 63 extending in the direction vertical to a surface including the plane of printed circuit board 36 is provided in the circumference of stage 61. The length A of second flange 63 is set larger than the length a of the portion of the vertical vane portion 40*a* of chopper 8 which is inserted into photointerrupter 10. The length B of the gap in the horizontal direction between first flange 62 and second flange 63 is set smaller than the distance b between the vertical vane portion 40*a* and light emitting device 29 or light receiving device 30. This is for the purpose of preventing damages to the photointerrupter when the infrared ray sensor is assembled. More specifically, when chopper 8 engaged with the shaft of the motor (not shown) attached to stage 61 is assembled in shield box 44, and chopper 8 enters shield box 44 obliquely from the above, the lower end 63*a* of second flange 63 abuts against the upper surface of first flange 62, since A>a is established at the time, and therefore the lower end of vertical vane portion 40*a* does not bump into light emitting device 29 or light receiving device 30. In addition, since B<b, if chopper 8 slides in the horizontal direction during assembling the infrared ray sensor, vertical vane portion 40*a* does not bump into light emitting device 29 or light receiving device 30. Therefore, light emitting device 29 and light receiving device 30 are not damaged during assembling the infrared ray sensor. As a result, damages to the photointerrupter can be prevented during assembly.

Third Embodiment

Figure 22:
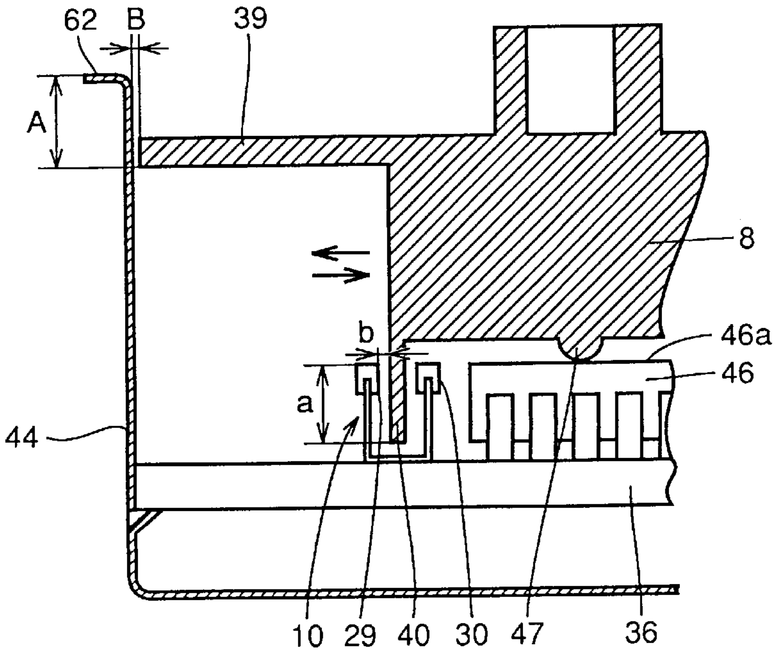
FIG. 22 is a view showing the internal structure of an infrared ray sensor according to a third embodiment of the invention.

FIG. 22 is a view showing the internal structure of an infrared ray sensor according to a third embodiment of the invention. There is provided a flange 62 extending outwardly in the horizontal direction at the upper end of shield box 44. The distance in the vertical direction A from the lower surface of horizontal vane portion 39 to the upper surface of flange 62 is set larger than the length a of the portion of the vertical vane portion 40 of chopper 8 which is inserted into photointerrupter 10. The length B of the gap in the horizontal direction between horizontal vane portion 39 and the inner wall surface of shield box 44 is set smaller than the distance b between light emitting device 29 and light receiving device 30. The same effects as the second embodiment may be brought about in this structure.

Note that the same reference characters represent the same or corresponding portions in the accompanying drawings.

As in the foregoing, a microwave oven according to the invention has an infrared ray sensor provided on a side of a cavity, and therefore the occupied area may be reduced as compared to the conventional case of providing an infrared ray sensor on the upper side.

In addition, a dedicated cooling fan for the infrared ray sensor, a solenoid, and a shutter are not necessary, which reduces the entire cost.

Furthermore, since the infrared ray sensor is disposed obliquely above food, it is not stained with bits bumping from the food.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cooking device comprising an infrared ray sensor disposed to sense infrared radiation from food obliquely, said infrared ray sensor comprising:

(1) a printed circuit board;

(2) a light receiving portion provided on said printed circuit board for absorbing infrared rays from said food and converting the absorbed infrared rays into electric energy;

(3) a photointerrupter provided on said printed circuit board including a light emitting device and a light receiving device spaced apart from each other;

(4) a chopper provided between said light receiving portion of said infrared ray sensor and said food for producing a differential between infrared radiation from said food and infrared radiation from a reference substance, (a) said chopper having (i) a horizontal vane portion having a plurality of vanes extending radially from the center of its axis and having vane portions and portions with no vane alternately provided in a plane parallel to the surface of said printed circuit board, and (ii) a vertical vane portion having a plurality of vanes extending vertically to the surface of said printed circuit board from the center of said horizontal vane portion, and having vane portions and portions with no vane alternately provided, said plurality of vanes being provided concentrically around said center of axis, (b) said chopper rotating around the center of its axis, (c) said chopper is provided between said light receiving portion of said infrared ray sensor and said food such that said vertical vane portion passes between said light emitting device and said light receiving device of said photointerrupter and that said horizontal vane portion passes between said light receiving portion of said infrared ray sensor and said food.

2. The cooking device as recited in claim 1, further comprising a tubular enclosure provided to cover said light receiving portion on said printed circuit board and having an opening at its upper end through which infrared rays pass.

3. The cooking device as recited in claim 1, further comprising a shield box having a bottom surface and a sidewall surface for accommodating said printed circuit board and said chopper, wherein said sidewall surface has a plurality of ventilation holes to let in cooling air, said ventilation holes are provided at positions so selected that said cooling air does not directly enter said opening of said enclosure.

4. The cooking device as recited in claim 3, wherein said printed circuit board is fixed to said bottom surface of said shield box, and said ventilation holes are provided at positions lower than the height of said upper end portion from the surface of said printed circuit board.

5. The cooking device as recited in claim 1, further comprising a control IC provided on said printed circuit board and having an upper surface and a motor to rotate said chopper, wherein said chopper is pressed in and fixed to the shaft of said motor, said chopper has a raised portion provided at its center and extending toward the surface of said printed circuit board, and the height of said raised portion is selected such that said raised portion abuts against said upper surface of said control IC and that said chopper is not completely detached from the shaft of said motor.

6. The cooking device as recited in claim 1, further comprising a motor for rotating said chopper;

a shield box for accommodating said printed circuit board and said chopper; and a resin board provided between said motor and said shield box for preventing heat generated from said motor from coming into said shield box, said resin board and said motor being separated from each other to define an air layer therebetween.

7. The cooking device as recited in claim 1, wherein there is no electronic component provided at the position on said printed circuit board through which said vertical vane portion of said chopper passes.

8. The cooking device as recited in claim 1, further comprising means provided on said printed circuit board for fixing input terminals in a bundle.

9. The cooking device as recited in claim 1, further comprising:

a motor for rotating said chopper;

a stage for installing said motor;

a shield box for accommodating said printed circuit board and said chopper;

a first flange provided on the upper end of said shield box and extending outwardly in the horizontal direction; and a second flange provided in the circumference of said stage and extending in the direction toward a surface including the plane of said printed circuit board, wherein the length of said second flange is set larger than the length of the portion of said vertical vane portion of said chopper which is inserted into said photointerrupter, and the length of the gap in the horizontal direction between said first flange and said second flange is set smaller than the distance between said vertical vane portion and said light emitting device or said light receiving device.

10. The cooking device as recited in claim 1, further comprising:

a shield box having a bottom surface and a sidewall surface for accommodating said printed circuit board and said chopper; and a flange provided on the upper end of said shield box and extending outwardly in the horizontal direction, wherein the distance in the vertical direction from the bottom surface of said horizontal vane portion to the upper surface of said flange is set larger than the length of the portion of said vertical vane portion of said chopper which is inserted into said photointerrupter, and the length of the gap in the horizontal direction between said horizontal vane portion and the inner sidewall surface of said shield box is set smaller than the distance between said vertical vane portion and said light emitting device or said light receiving device.

* * * * *